United States Patent [19]

Rider

[11] Patent Number: 4,565,970

[45] Date of Patent: Jan. 21, 1986

[54] PRECISION HARMONIC REJECTING DEMODULATOR WITH DIGITAL PHASE ALIGNMENT

[75] Inventor: Billie F. Rider, Cedar Rapids, Iowa

[73] Assignee: Rockwell International Corporation, El Segundo, Calif.

[21] Appl. No.: 435,516

[22] Filed: Oct. 20, 1982

[51] Int. Cl.[4] .............................................. H03D 3/18
[52] U.S. Cl. ..................................... 329/50; 329/146; 329/167
[58] Field of Search ................. 329/50, 146, 167, 178; 324/162; 307/242

[56] References Cited

U.S. PATENT DOCUMENTS 3,631,355  12/1971  Vail .................................. 307/242 X
4,194,161  3/1980  Hershberger ........................ 329/50

Primary Examiner—Eugene R. LaRoche
Assistant Examiner—Robert J. Pascal
Attorney, Agent, or Firm—Edward A. Gerlaugh; George A. Montanye; H. Fredrick Hamann

[57] ABSTRACT

A low-cost, two-axis rate and acceleration sensor utilizing piezoelectric generator elements affixed to a rotating structure and generating a periodic signal having an amplitude representing the rates and accelerations. A demodulator dividing the period of the signal into a plurality of segments and regenerating selected ones of the signal segments in accordance with a predetermined pattern stored in a fixed store, the regenerated signal segments being filtered to produce rate and acceleration analog voltages.

9 Claims, 12 Drawing Figures

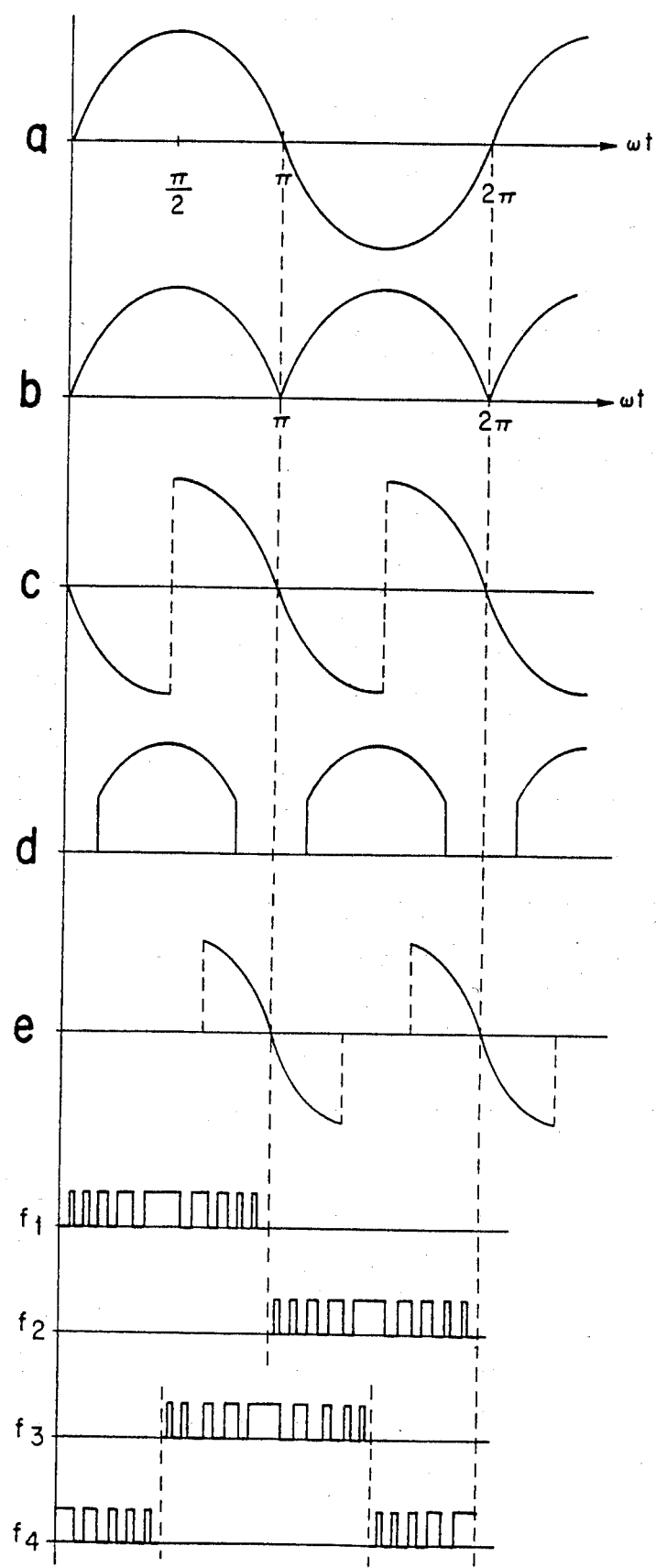

PRECISION HARMONIC REJECTING DEMODULATOR WITH DIGITAL PHASE ALIGNMENT

CROSS-REFERENCE TO RELATED APPLICATIONS

This application relates to my co-pending U.S. patent application Ser. No. 370,641 "Sensor Assembly for Strapped-Down Attitude and Heading Reference System" now U.S. Pat. No. 4,444,053 issued Apr. 24, 1984; Ser. No. 402,529, "Sensor Assembly Having Means for Cancellation of Harmonc Induced Bias From a Two-Axis Linear Accelerometer", now U.S. Pat. No. 4,462,254 issued July 31, 1984; and Ser. No. 402,522, "Cross-Axis Acceleration Compensation for Angular Rate Sensing Apparatus", now U.S. Pat. No. 4,520,669 issued June 4, 1985, all of which related applications are assigned to the same assignee as the instant application.

BACKGROUND OF THE INVENTION

This invention relates generally to reference apparatus for navigable vehicles such as aircraft, and more particularly, to rate/acceleration sensors used in an attitude and heading reference system. Advancement in the art of precision flight control and guidance apparatus for aircraft, missiles, and space vehicles depends in part on progress in sensor technology. Present computer technology allows sophisticated and complex signal processing at reasonable cost, but the information processed is frequently derived from sensors having a cost which is a disproportionate part of the system cost.

A reference system having inertial instruments rigidly fixed along a vehicle-based orientation reference wherein the instruments are subjected to vehicle rotations and the instrument outputs are stabilized computationally instead of mechanically is termed a gimballess or strapped-down system. Such systems generally include computing means receiving navaid data such as magnetic and radio heading; air data such as barometric pressure, density, and air speed; along with output signals of the inertial instruments for generating signals representative of vehicle position and orientation relative to a system of coordinate axis, usually earth oriented. The presence of high angular rates associated with strapped-down systems adversely affects performance and mechanization requirements. Consequently, such reference systems have been used extensively in missiles, space, and military vehicles, but their use in commercial aircraft has been less extensive because of economic constraints associated with the manufacture of precision mechanical assemblies, i.e., gyroscopes and other precision sensors. Strapped-down inertial reference systems become practical for commercial aircraft from the standpoint of cost of ownership, weight, reliability, and maintainability with the advent of small, lightweight, highly accurate and relatively low-cost rate sensors and accelerometers. Angular rate sensing apparatus utilizing rotating piezoelectric generators are known; see for example U.S. Pat. Nos. 2,716,893 and 4,197,737. Such devices generally comprise piezoelectric generator elements mounted to a rotatable drive shaft and oriented for generating signals responsive to particular bending forces sensed by the instrument; the processing of signals derived from such instrumentation involves the measurement, amplification and transmission of very low level DC and low frequency signals. A sinusoidal carrier signal, amplitude modulated with a low level signal, may be utilized as a transmission medium; often, it is desirable to transmit two information-bearing signals on one carrier signal by use of a quadrature amplitude modulator. After amplification and transmission of the desired signals, accurate DC analogs of the original signals may be regenerated. Demodulators in the prior art have exhibited signal degradations which make the devices unsuitable for some applications, e.g., the signals being processed may contain undesirable carrier harmonics, DC bias, and other noise components such as those caused by signal phase shifts and mechanical misalignments in the system, which undesirable components must be rejected to prevent degradation of the low-level signals of primary interest.

In view of the problems of present state-of-the-art sensors, described above, it is a general objective of the present invention to develop an improved low-cost sensor assembly for generating signals representative of vehicle accelerations and angular rates.

A more specific object of the invention is to provide an improved low-level signal demodulator in a multi-function sensor system.

It is another object of the invention to provide an improved demodulator wherein undesired signal components such as carrier signal harmonics, DC bias and noise are removed from the output signal.

SUMMARY OF THE INVENTION

In accordance with one aspect of the invention, there is provided in a low cost, compact sensor assembly having piezoelectric generator bender elements mounted on a rotating member for sensing angular rates and linear acceleration of a vehicle, and circuits mounted on the rotating member including a quadrature amplitude modulator which impresses the low-level DC signals generated by the bender elements on a periodic signal having a frequency related to the frequency of the rotating member for coupling off the rotating element, an improved demodulator having an alignment and sampling controller utilizing a precision digital clock signal and a counter for sequentially addressing a store having stored therein a predetermined pattern of control signals. The control signals control the operation of an analog switch to regenerate selected segments of the periodic signal, which selected segments are low pass filtered to generate a voltage analog of the low level DC signals. A synchronizing signal generated by the rotating element presets the counter to an initial address thereby aligning the sampling controller in phase with the periodic signal.

BRIEF DESCRIPTION OF THE DRAWINGS

The invention is pointed out with particularity in the appended claims; however, specific objects, features, and advantages of the invention will become more apparent and the invention will best be understood by referring to the following description of the preferred embodiment in conjunction with the accompanying drawings, in which:

FIG. 8 is a timing diagram useful in explaining the operation of the present invention.

DESCRIPTION OF THE PREFERRED EMBODIMENT

Figure 1:
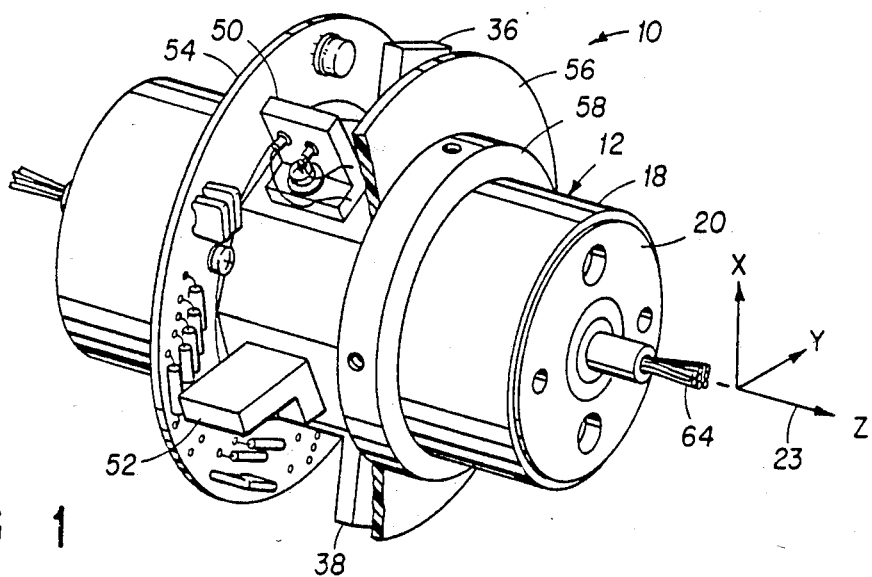
FIG. 1 is a pictorial view, partially cut away, of a sensor assembly in accordance with the present invention.
Figure 2:
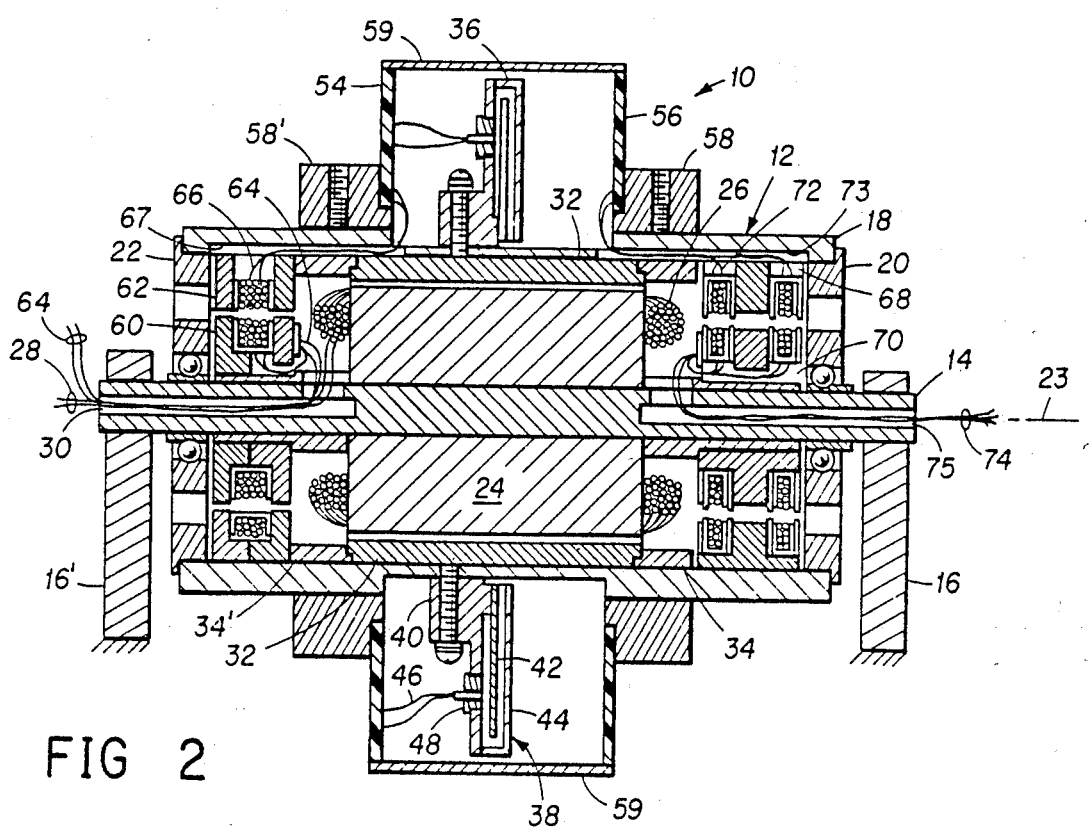
FIG. 2 is a section view of a sensor assembly in accordance with the instant invention.

Referring now to the various views of the drawing for a more detailed description of the components, materials, construction, operation and other features of the invention by characters of reference, FIGS. 1 and 2 show a sensor assembly 10 constructed in accordance with the present invention. The sensor assembly 10 comprises a hysteresis motor having a fixed axial shaft 14. The shaft 14 is mounted and rigidly affixed, at either end thereof, to a structural member 16, 16[1] having an orientation fixed with respect to a vehicle (not shown) in which the sensor assembly 10 is installed. A rotating element of the motor 12 comprises a cylindrical motor housing or sleeve 18 journaled for rotation about the shaft 14 on bearings 20, 22, the spin axis 23 of the sleeve 18 being coaxial with the shaft 14. The bearings 20, 22 are end-cap roller bearings bonded with a preload to the shaft 14 and pressed into the ends of the motor housing 18. A stator 24 and its associated windings 26 surrounds the shaft 14 and is affixed thereto. Leads 28 for supplying alternating current to the stator windings 26 emanate from the motor via a central bore 30 in the shaft 14. A cylindroid hysteresis ring 32 of magnetic material is mounted interiorly of the motor housing 18 for rotation therewith between a pair of ring spacers 34, 34[1]. The spacers 34, 34[1] are made from a non-magnetic material such as austenitic stainless steel, the preferred material being 304 stainless steel. The hystersis ring 32 is juxtaposed with the stator 24, driving the rotating element in response to alternating current applied to the leads 28 of the stator windings 26. The motor housing 18 is made from martensitic stainless steel such as 416 stainless steel. The materials were chosen to keep the bearing thermal expansion loop matched with respect to coefficient of expansion so as to maintain the bearing preload over temperature extremes. A motor such as the motor 12 having a fixed shaft and stator, and an externally disposed rotating structure, is termed an inside-out motor.

A pair of piezoelectric (PE) crystal assemblies 36, 38 are mounted exteriorly on the rotating motor housing 18 on opposite sides thereof. Each of the crystal assemblies 36, 38 comprises a base 50 to which a piezoelectric bender element 42 is mounted in cantilever fashion. A cover 44 in cooperation with the base 40 extended encloses the bender element 42. Leads 46 conduct output signals generated by the piezoelectric bender elements 42 via feedthrough terminals 48 to electronic circuits carried on the rotating element of the sensor assembly 10.

Referring still to FIG. 1, a second pair of piezoelectric crystal assemblies 50, 52 are shown mounted exteriorly on the rotating motor housing 18 for measuring accelerations in a plane perpendicular to the spin axis 23 of the sensor assembly 10. The crystal assemblies 50, 52 are mounted having bending axes thereof essentially parallel with the spin axis 23 of the sensor assembly 10, and axes of sensitivity essentially perpendicular to the spin axis 23. "Essentially parallel" and "essentially perpendicular" mean as parallel and as perpendicular as manufacture will reasonably allow, but including some slight misalignment which may be detected in output signals generated by the crystal assemblies. While the crystal assemblies 50, 52, are shown mounted orthogonally of each other, they can be mounted with their axes of sensitivity displaced with respect to each other by any angle, or one could be omitted; however, a nominal 90° separation between two crystal assemblies is the preferred arrangement for reasons which will be explained hereinafter.

A pair of annular circuit boards 54, 56 are mounted exteriorly of the motor housing 18 for rotation therewith by any suitable means such as collars 58, 58[1]. A cylindrical plate 59 (see FIG. 2) extending between the peripheral ends of the circuit boards 54, 56 encloses the space therebetween, serving as a dust cover for the circuit devices carried on the boards. The enclosure formed by the circuit boards 54, 56 and the plate 59 protects the PE crystal assemblies 36, 38, 50, 52 from turbulent air currents which could be generated if the rotating components were not so protected. Referring to FIG. 2, an annular, air-gap power transformer having a stationary primary coil 60 affixed to the shaft 14, and a rotating secondary coil 62 concentric with the primary coil 60 and mounted inside the rotating sleeve 18 supplies power to electronic circuits on the circuit boards 54, 56. Power leads 64 transmitting alternating current are routed through the central bore 30 of the shaft 14 and connected to the primary coil 60 of the power transformer. Similarly, power leads 66 from the secondary coil 62 of the transformer are routed via a slot 67 in the motor housing 18 to the circuit boards 54, 56. An annular, air-core signal transformer having a primary coil 68 mounted inside the sleeve 18 for rotation therewith and a secondary coil 70 affixed to the shaft 14 couples output signals of circuits (components of which are shown in FIG. 1) on circuit boards 54, 56 via leads 72 routed through a slot 73 in the sleeve 18 to the primary coil 68, and from the secondary coil 70 via leads 74 routed through a central bore 75 of the shaft 14 to user circuits external of the sensor assembly 10.

Figure 3:
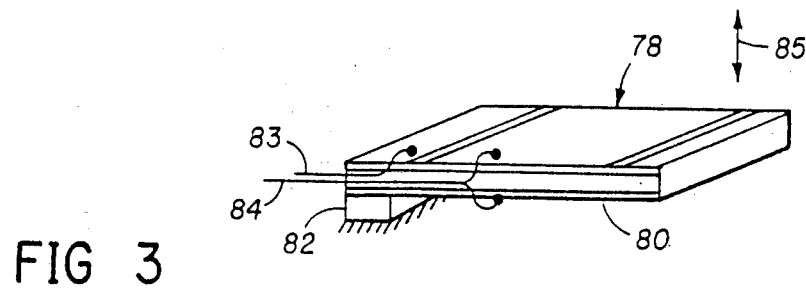
FIG. 3 is a pictorial view of a piezoelectric bender element utilized in the practice of the invention.

Referring now to FIG. 3, there is shown in greater detail a piezoelectric bender element 78 like the bender elements 42 of FIG. 2. The bender element 78 comprises a cantilevered piezoelectric-crystal sensor 80 affixed to a mounting member or base 82. The bender element 78 generates a voltage $V_o$ on output leads 83, 84 which is proportional to the bending moment generated by accelerations acting on the mass of the sensor 80 itself along an axis of sensitivity illustrated by the line 85, the bending axis of the bender element 78 being in the plane of the sensor 80 and parallel with the longitudinal dimension of the base 82. The bender element 78 is inherently sensitive without the addition of proof mass.

Referring to FIG. 1, the desired accelerations are available when the piezoelectric bender elements 36, 38, 50, 52 are rotated at a fixed frequency, 3120 revolutions per minute in the presently described embodiment, about the spin axis 23 as shown in FIG. 1.

A measurement of linear acceleration is accomplished simply by measuring the phase and amplitude of the AC signal obtained by rotating the bender elements 50, 52 in the plane of interest. For rate measurement, the piezoelectric bender elements 36, 38 are oriented as shown in FIGS. 1 and 2 to sense acceleration along the spin axis 23. The bender elements 36, 38 are rotated at the fixed spin frequency, N, in radians per second, the spin axis 23 being oriented and fixed, for example, along the roll axis of an aircraft, and the sensor assembly 10 measures pitch and yaw rate. As the aircraft experiences an angular rate perpendicular to the spin axis, a useful coriolis acceleration along the spin axis acts on the mass of the bender elements 36, 38. At a point (r, α) on the bender element, the acceleration along the spin axis is given by $$a = 2Nr\dot{\theta} \cos(Nt-\alpha) + 2Nr\dot{\psi} \sin(Nt-\alpha) \qquad (1)$$

where $\dot{\theta}$ and $\dot{\psi}$ are pitch and yaw rates, r is the radial distance from the spin axis to the point on the bender element and α is the angular location of the point on the bender element from the axis about which angular rate is being sensed. A sinusoidal output voltage $V_o$ is generated by the bender element as a result of the force and stress exerted on the piezoceramic material therein. The output voltage is of the form:

$$V_o = K\dot{\theta}N \cos Nt + K\dot{\psi}N \sin Nt \qquad (2)$$

where K is a sensitivity constant for the bender element, $\dot{\theta}$ represents the angular displacement or tilt of the spin axis in the Y-Z plane, and $\dot{\psi}$ represents the angular displacement or tilt of the spin axis in the X-Z plane. $\dot{\theta}$ and $\dot{\psi}$ are, respectively, $d\theta/dt$ and $d\psi/dt$ or angular rates, respectively, about the Y-axis and the X-axis as shown in FIG. 1. In the circuits of the instant invention, the output voltage $V_o$ is phase detected and measured to determine the desired rates $\dot{\theta}$ and $\dot{\psi}$. $V_o$ is an inherently bias-free AC signal; signal-to-noise ratios of several dB are exhibited at input rates equivalent to earth rate or less.

Figure 5:
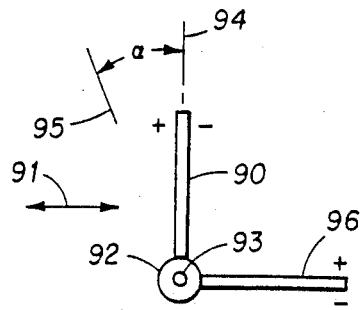
FIG. 5 is a diagramatic representation of linear acceleration sensors useful in explaining the operation of the present invention.

FIG. 5 illustrates an elementary form of a two-axis linear accelerometer such as the PE crystal assemblies 50, 52 of FIG. 1. An acceleration-sensitive device 90 such as a piezoelectric bender element having an axis of sensitivity along a line 91 is affixed to a rotating element or shaft 92 rotating at an angular velocity $\omega_n$ about a spin axis 93. Acceleration components anywhere in the plane perpendicular to the spin axis 93 (the plane of the paper in FIG. 5) are measured; since such a plane is defined by two axes, the illustrated sensor is referred to as a two-axis accelerometer. Assuming that FIG. 5 shows the acceleration-sensitive element 90 at a reference time $\omega_n t=0$; that a force on the positive (+) side of the element 90 generates a positive voltage proportional to the force; and that the force is local acceleration a(t) acting on the mass of the acceleration-sensitive device 90, then because of the rotation, the voltage generated is of the form:

$$v_1 = Ka(t) \sin(\omega_n t + \alpha) \qquad (3)$$

where K is a scale factor, a(t) is the local acceleration, α is an angle between a reference axis 94 of the acceleration-sensitive device 90 and the acceleration force a(t), the latter represented by a line 95. A utilizing means would typically measure the amplitude and phase of the voltage generated by the acceleration-sensitive device 90 to determine the amplitude and direction of the acceleration a(t); however, a problem arises when the measured acceleration contains a component at a frequency $2\omega_n$ as well as the normally steady-state or low frequency acceleration (g) which is the quantity of interest to be measured. That is, if $$a(t) = g + a_1 \sin 2\omega_n t \qquad (4)$$

the voltage generated with reference to equation (3) contains a term which renders g indistinguishable from the $2\omega_n$ acceleration components. The problem is pervasive since rotating elements such as the rotating element 92 characteristically comprise ball bearings which commonly generate a $2\omega_n$ acceleration component.

The scale factor of the acceleration sensor is not determined by the spin speed of the sensor assembly since no coriolis is involved, the coriolis term being perpendicular to the sensitive axis of the acceleration sensor. Assuming that a constant acceleration (such as gravity) component exists along the line 91, the acceleration sensor 90 is bent by its own weight, and the bending direction is the same direction as the shaft 92 rotation. After the shaft 92 rotates 180°, the bending moment is essentially equal and opposite; therefore, a sinusoidal output signal is generated, the amplitude and phase depending on the relative direction of the g field in the sensitive plane. The accelerometer sensitivity has the form:

$$\left. Q \right|_a = d_{31} P W (X_2 - X_1)^3 a_{xy}(t) \cos(nt - \alpha) \qquad (5)$$

Note that n is not a scale factor, and that $(\chi_2 - \chi_1)$ is the length of the active sensor. If the acceleration $a_{xy}(t)$ is a sinusoidal vibration $\omega_a$, the charge output has a sinusoidal component at frequencies $(\omega_a + N)$ and $(\omega_a - N)$. For most frequencies, these terms do not result in steady-state outputs; however, certain harmonic frequencies such as $\omega_a = 2n$ cause potentially serious performance problems. At $\omega_a = 2n$, a 1n signal and a 3n signal are generated. The 3n signal is rejected, but the 1n signal has the appearance of steady-state acceleration.

In order to measure the nominally steady-state component g in the presence of a $2\omega_n$ term, a second acceleration-sensitive device 96 is mounted to the rotating structure 92 and oriented at 90° from the first device 90 as shown in FIG. 5. The devices 90, 96 may be angularly displaced from each other by any non-zero angle, however, a 90° offset is preferred. If the sensitivity of the devices 90, 96 are virtually identical and the devices 90, 96 are physically oriented 90° apart, the $2\omega_n$ component will be cancelled if the output signal from the second acceleration-sensitive device 96 is shifted in phase by 90° and added to the output signal from the first device. Assume that a local gravity field g exerts a force along the null axis 94 of the sensor 90 at $\omega t=0$, and that a positive force on the + side of the sensors 90, 96 generates, respectively, positive voltages $v_1$ and $v_2$. Because the rotating element 92 rotates at an angular velocity $\omega_n$, the sensor assembly acts as a modulator, and $$v_{out} = Ka(t) \sin \omega_n t \tag{6}$$

Let $$a(t) = g + H \sin (2\omega_n t + \beta) \tag{7}$$

Then $$v_1 = [g \sin \omega_n t + H \sin (2\omega_n t + \beta) \sin \omega_n t] K_1 \tag{8}$$

$$v_2 = [g \cos \omega_n t + H \sin (2\omega_n t + \beta) \cos \omega_n t] K_2 \tag{9}$$

Using the identities $$\sin \alpha \sin \beta = \tfrac{1}{2} \cos (\alpha - \beta) - \tfrac{1}{2} \cos (\alpha + \beta) \tag{10}$$

$$\sin \alpha \cos \beta = \tfrac{1}{2} \sin (\alpha + \beta) + \tfrac{1}{2} \sin (\alpha + \beta) \tag{11}$$

Then $$v_1 = [g \sin \omega_n t + {}^{H}/2 \cos (\omega_n t + \beta) - {}^{H}/2 \cos (3\omega_n t + \beta)] K_1 \tag{12}$$

$$v_2 = [g \cos \omega_n t + {}^{H}/2 \sin (\omega_n t + \beta) + {}^{H}/2 \sin (3\omega_n t + \beta)] K_2 \tag{13}$$

With only one sensor 90 or 96, H corrupts the apparent amplitude and phase of the acceleration vector g, and a $3\omega_n$ signal is generated and must be rejected. Ignoring in this instance the $3\omega_n$ component, cancellation of the H terms is accomplished if $v_2$ is delayed 90° electrically, whereby $v_2$ delayed becomes $v_{22}$ and $$v_{22} = [g \sin \omega_n - \text{hu } H/2 \cos (\omega_n t + \beta)] K_{22} \tag{14}$$

$$v_1 = [g \sin \omega_n t + {}^{H}/2 \cos (\omega_n t + \beta)] K_1 \tag{15}$$

adding (14) and (15) cancels the H terms if the scale factors $K_1$ and $K_{22}$ associated with the sensors 90, 96 are identical.

Figure 6A:
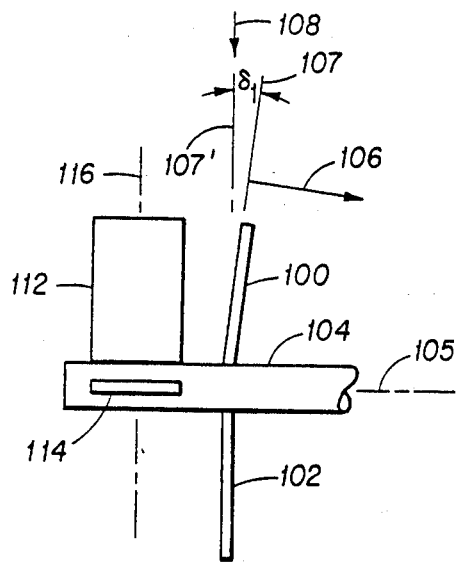
FIGS. 6A and 6B are diagramatic representations of angular rate and linear acceleration sensors useful in explaining the operation of the present invention.

Referring again to FIG. 1, undesirable accelerations occurring in the spin plane (X,Y) of the sensor assembly 10 which may be caused by mechanical misalignments in the sensor assembly 10 and/or externally applied vibrations, apply force along the length of the rate sensors 36, 38. If the electrical null axis of the sensors 36, 38 is exactly in the X,Y plane, no output signal resulting from the unwanted accelerations is generated; however, such exactness is achieved only through precision mechanical assembly which precludes low-cost implementation. The present invention achieves low-cost implementation by providing electronic means for compensating for imprecise mechanical construction. Referring now to FIG. 6A, there is shown a simplified diagram of a pair of piezoelectric bender elements 100, 102 mounted on a rotating member 104 having a spin axis along a line 105. The spin axis 105 is parallel with coriolis acceleration components to be measured by the bender elements 100, 102, the coriolis accelerations being developed when the spin axis 105 is rotated in space. The resulting acceleration is proportional to the rate of rotation of the rotating member 104 and is a well-known phenomenon. Referring now to the bender element 100 of FIG. 6A (the description, however, being applicable to either element 100, 102), the bender element 100 is mounted on the rotating member 104 such that an acceleration sensitive axis 106 of the sensor 100 is essentially parallel with the spin axis 105, i.e., as parallel as mechanical construction will allow, but shown considerably offset in the drawing for illustrative purposes. A null axis 107 of the sensor 100 exists such that steady-state or low frequency (relative to the resonant frequency of the sensor 100) accelerations along the null axis 107 generate no output signals from the sensor 100. On the other hand, acceleration components along the acceleration-sensitive axis 106 result in the generation of an electrical signal $V_c$ in the sensor 100 which is of the form:

$$V_c = K\dot{\phi}\omega_n \sin (\omega_n t + \alpha) \tag{16}$$

Figure 6C:
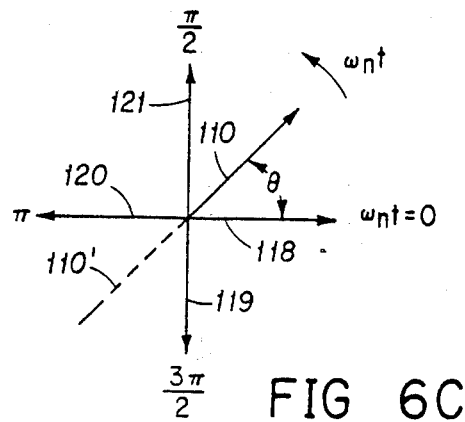
FIG. 6C is a vector diagram useful in explaining the operation of the present invention.
Figure 6B:
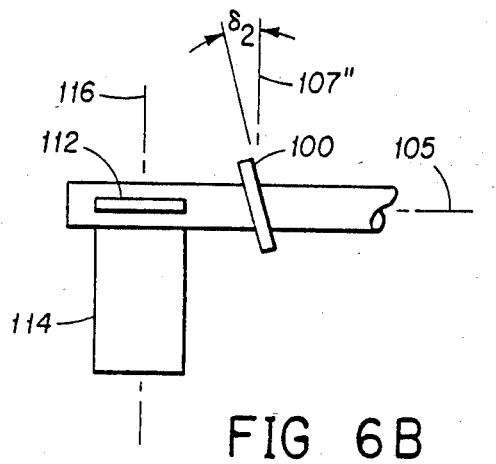
Figure 6D:
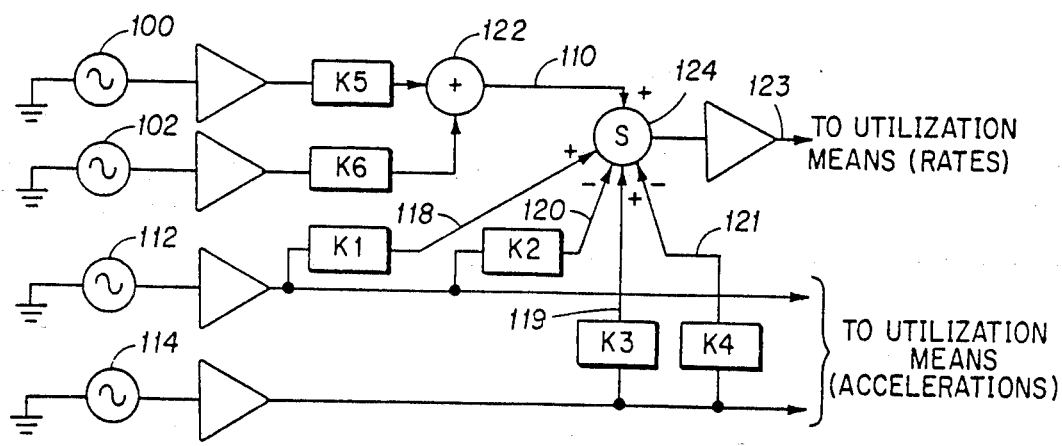
FIG. 6D is a simplified block diagram of one embodiment of compensation means utilized in the present invention.

When the sensor 100 is misaligned by an angle $\delta_1$, from a true null axis $107^1$ of the assembly as shown in FIG. 6A and/or by an angle $\delta_2$ from a true null axis $107^{11}$ as shown in FIG. 6B, and if a cross-axis acceleration 108 exists, then the sensor 100 generates a signal $V_{ca}$ responsive to the cross-axis acceleration 108 which is of the form:

$$V_{ca} = Ka\epsilon \sin (\omega_n t + \alpha) \tag{17}$$

where $\alpha$ is a phase shift dependent on the orientation of the misalignment. Under certain circumstances, the signal output resulting from the misalignments $\delta_1$ and $\delta_2$ are indistinguishable from the desired signal. Misalignments $\delta_1$ and $\delta_2$ can be eliminated or reduced to tolerable levels by precise mechanical construction; however such precision construction is costly. Referring now to FIGS. 6A–C, FIG. 6C is a simplified vector diagram representative of the output signals developed by a misaligned acceleration-sensitive components such as the sensor 100. The existence of misalignments $\delta_1$ and $\delta_2$ results in an interfering signal represented by the vector 110. An interfering signal such as the signal 110 can be expected to be of random phase for non-precision assembly, i.e., the signal 110 may fall in any quadrant of the FIG. 6C diagram. Means must therefore be provided which compensate for an interfering signal at any angle. Cross-axis acceleration compensation is accomplished in accordance with the present invention by two additional accelerometers 112, 114 mounted on the rotating member 104. The accelerometers 112, 114 measure the accelerations in the entire plane 116 perpendicular to the spin axis 105. While the accelerometers 112, 114 are shown angularly displaced from each other by 90°, they can be mounted at any non-zero angle with respect to each other; however, a nominal 90° separation is the preferred alignment. Referring still to FIGS. 6A–C, it is assumed that the accelerometers 112, 114 are aligned such that they nominally generate signals represented by vectors 118 and 119. Opposing vectors 120 and 121 may be generated by inverting, respectively, signals representative of the vectors 118 and 119; since the offending vector 110 can fall in any quadrant, a cancelling vector $110^1$ must be configurable for any quadrant. A cancelling vector can be generated in any quadrant by effecting the sums of selected ones of the four vectors 118, 119, 120, 121 of sufficient amplitude to form the desired vector. In the example illustrated in FIG. 6C, the cancelling vector $110^1$ is generated by selecting proper amplitudes of the $3\pi/2$ vector 119 and the $\pi$ vector 120. Referring now to FIG. 6D, the acceleration-sensitive devices 100, 102, 112, 114 described with reference to FIGS. 6A and 6B, are represented in FIG. 6D as sine wave generators 100, 102, 112, 114. The output signals of the rate sensors 100, 102 are combined after amplification in amplifiers having respective gains K5 and K6 in a summing means 122, the output signal of the summing means 122 comprising a desired signal 123 representative of the sensed angular rates plus the interfering signal 110. the output signals of the acceleration sensors 112, 114 are utilized to form the cancelling vector 110$^1$ by adjusting the appropriate gains K1, K2 corresponding respectively with the positive and negative output signal vectors 118, 120 of acceleration sensor 112, and gains K3, K4 corresponding respectively with the positive and negative output signal vectors 119, 121 of acceleration sensor 114, and selectively applying these signals to a summing means 124 along with the summed output signals of the angular rate sensors 100, 102. In the summing means 124, the cancelling vector 110$^1$ compensates for the interfering vector 110, and the output signal 123 consequently comprises only the desired angular rate components.

Figure 4:
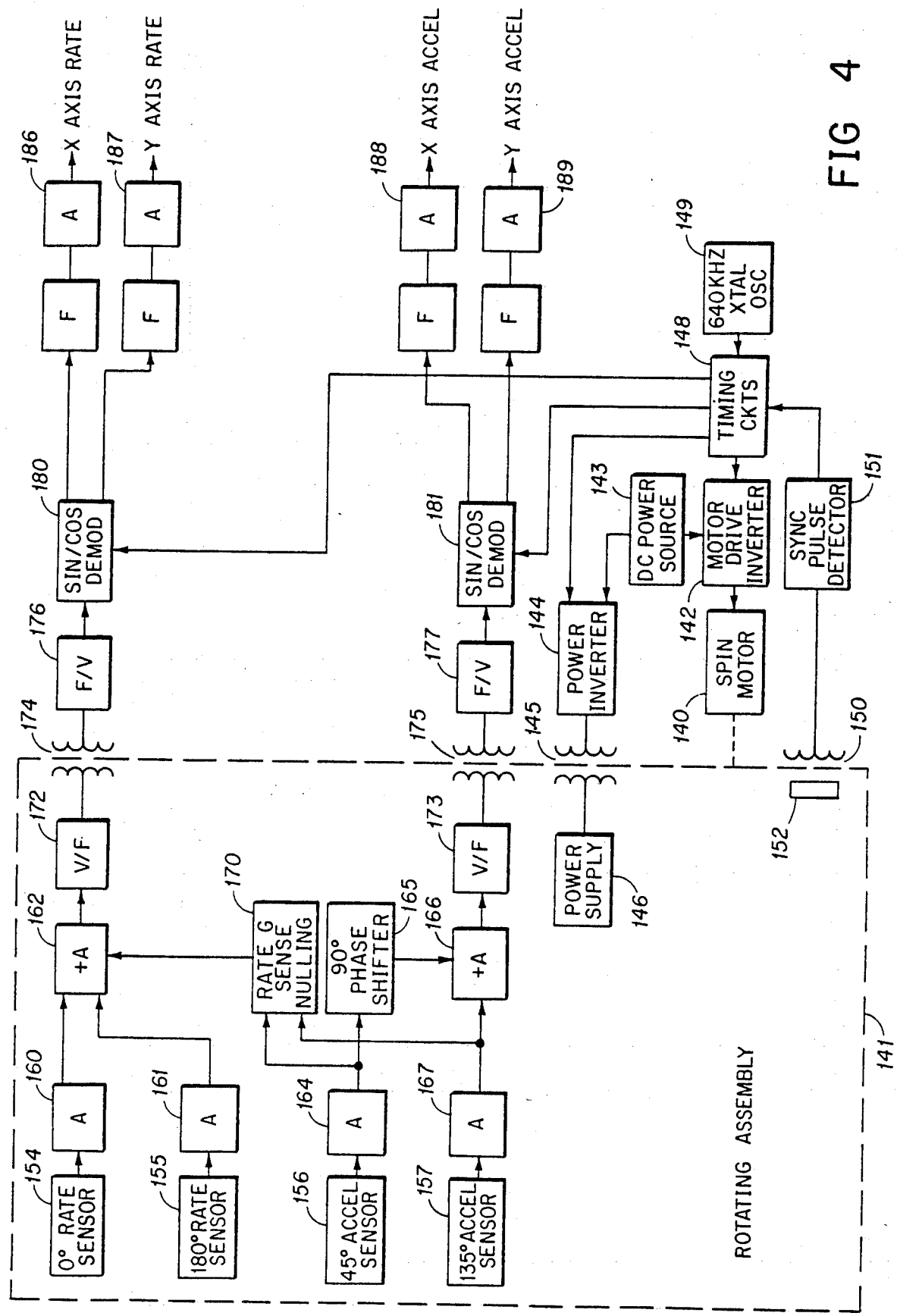
FIG. 4 is a schematic block diagram of the sensor assembly including circuit elements, both on and off the rotating structure, associated therewith.

FIG. 4 is a simplified block diagram of a two-axis rate and acceleration sensor assembly such as the sensor assembly 10 of FIG. 1, and the circuits associated therewith. The sensor assembly comprises a spin motor having a fixed stator assembly represented by the block 140 and a rotating assembly 141; circuits carried on the rotating assembly 141 are mounted on annular printed circuit boards previously described with reference to FIG. 1. The spin motor is a hysteresis synchronous motor driven by an inverter 142 operating from a regulated DC power source 143. A power inverter 144 serves as an AC power source for the circuits on the rotating assembly 141, the AC being coupled via an air-gap transformer 145 to a power supply 146 on the rotating assembly 141. The power supply 146 rectifies and filters the AC and supplies DC operating voltage to the circuits carried on the rotating assembly 141. Timing circuits 148 generate control signals and timing pulses for synchronizing and controlling the operation of the sensor circuits. The timing circuits 148 receive an input derived from a precision clock source, such as a 640 kHz crystal oscillator 149 shown in the presently described embodiment. A synchronizing signal representative of the position of the rotating assembly 141 with respect to the fixed elements of sensor assembly is coupled from a transducer 150 via a sync pulse detector 151 to the timing circuits 148. The source of the synchronizing signal may be a magnetic element 152 affixed to the rotating assembly to which the transducer 150, e.g. a variable-reluctance coil, is responsive as the magnetic element 152 passes the fixed element 150. The position reference of the rotating assembly 141 may be generated alternatively by any suitable means such as optoelectronic devices.

Four miniature piezoelectric bender elements 154, 155, 156, 157 mounted on the rotating assembly 141 are used to sense the accelerations of interest. Two sensors 154, 155 are oriented with their sensitive axes parallel to the spin axis (as previously shown with reference to FIG. 1) to measure coriolis acceleration proportional to rates of turn about selected axes perpendicular to the spin axis. Two other sensors 156, 157 are mounted with their sensitive axes perpendicular to the spin axis for measuring linear accelerations in the plane perpendicular to the spin axis. Sinusoidal electrical signals generated by the rate sensors 154, 155 are coupled, respectively, via buffer amplifiers 160, 161 to a summing amplifier 162. Output signals generated by the acceleration sensor 156 are coupled via a buffer amplifier 164 and a 90° phase shift circuit 165 to a summing amplifier 166; output signals generated by the acceleration sensor 157 are coupled via a buffer amplifier 167 to the summing amplifier 166. A rate G-sense nulling circuit 170 provides means for coupling selectable portions of the signals generated by the acceleration sensors 156, 157 to the summing amplifier 162 for cancelling undesired signals representative of cross-axis accelerations sensed by the rate sensors 154, 155. The output signals of the summing amplifiers 162, 166 drive, respectively, two linear voltage-to-frequency converters 172, 173. The output signal of the voltage-to-frequency converter 172 comprises a series of pulses 4 microseconds wide having a center frequency of approximately 60 kHz which varies in frequency proportional to the applied input voltage. The frequency-modulated output pulse train is coupled to the transformer 174 for transmission off the rotating element 141. The output signal of the voltage-to-frequency converter 173 is a series of pulses four microseconds wide having a center frequency offset approximately 2 kHz from the center frequency of the voltage-to-frequency converter 172, which offset center frequency varies in proportion to the applied input voltage. The output signal of the voltage-to-frequency converter 173 is coupled to the transformer 175 for transmission off the rotating assembly 141. The center frequencies of the voltage-to-frequency converters 172, 173 are offset to preclude cross-coupling of the acceleration signals to the rate signal circuits when the aircraft, in straight and level flight, experiences a relatively constant one-g acceleration field and comparatively very low rate-signal perturbations with virtually zero signal output.

The frequency-modulated pulses are converted back to analog voltages in frequency-to-voltage converters 176, 177. The regenerated signals output from the frequency-to-voltage converters 176, 177 are sinusoidal at the spin frequency of the rotating assembly 141, having amplitude and phase representative of the respective rate and acceleration components sensed by the rotating crystal assemblies. Sin/Cos demodulators 180, 181 regenerate the analog voltages representative, respectively, of angular rate about two axes, and linear acceleration along two axes. Timing signals from the timing circuits 148 control the regeneration of the analog voltages; the synchronizing signal from the sync pulse detector 151 allows adjustment of the phase of the demodulator sampling function to compensate for phase shifts in the system. The demodulator 180, 181 output signals are filtered to remove the carrier (spin frequency) harmonics, and are coupled to an external user device such as an aircraft attitude and heading reference system via buffer amplifiers 186, 187, 188, 189.

Figure 7A:
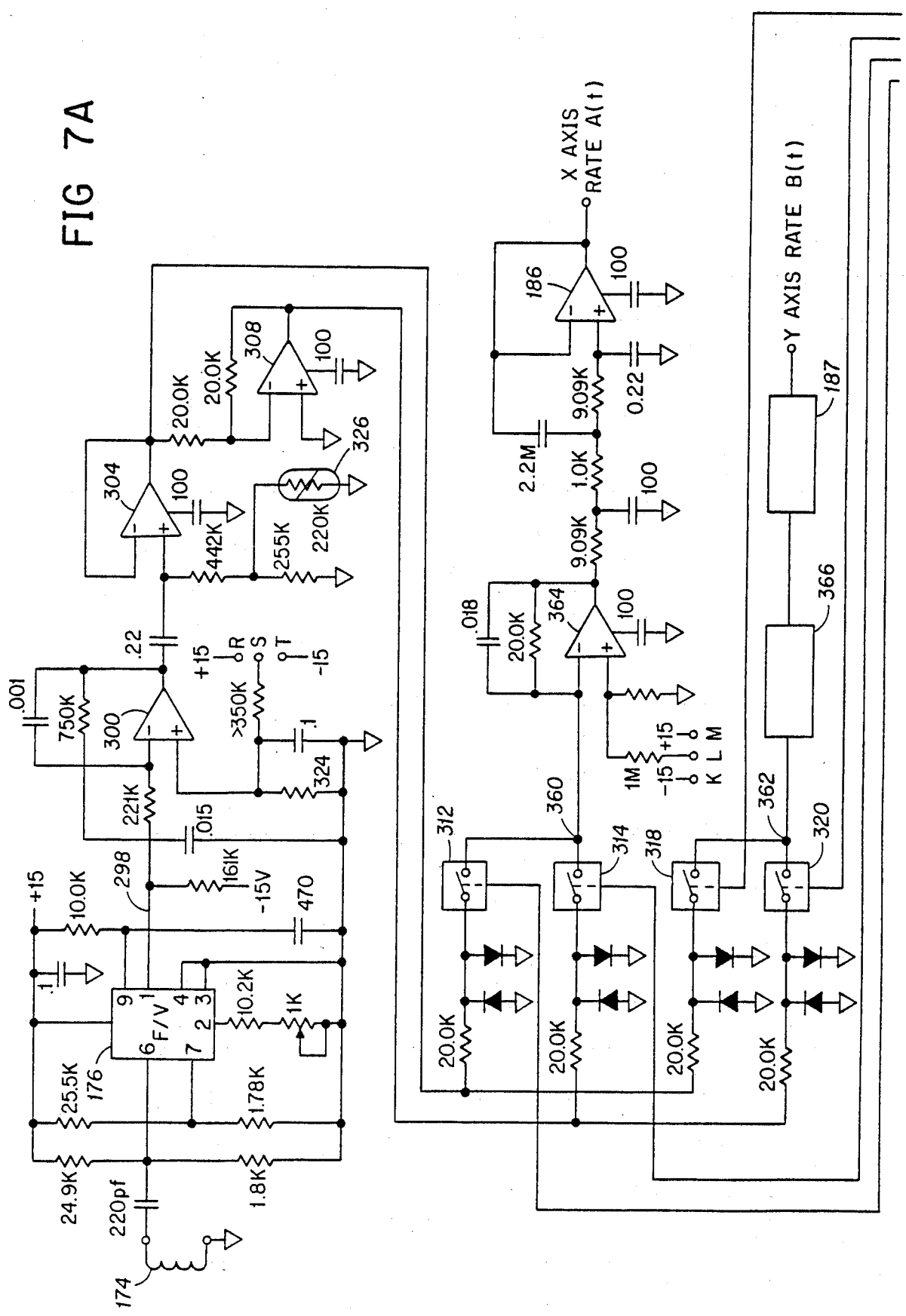
FIGS. 7A and 7B show a detailed electrical schematic diagram of the demodulator circuit of the present invention.

Referring now to FIG. 7, a detailed electrical schematic diagram of the demodulators and associated circuits of FIG. 4 is shown in greater detail. Reference characters of like circuit elements are the same in FIGS. 4 and 7, the acceleration circuits being virtually identical. For simplicity, only the X and Y axis rate demodulator circuits are shown in FIG. 7. As aforementioned, the frequency-modulated pulses carrying the X and Y axis rate data are coupled via the air core rotary transformer 174 to the frequency-to-voltage converter 176. The output signal of the frequency-to-voltage converter 176 is coupled to an operational amplifier stage 300 which serves to remove DC bias from the regenerated sinusoidal signal, and further functions as a band-pass amplifier at the carrier frequency, i.e., 52 Hz, the frequency of rotation of the rotating element. Terminals labeled R, S, T are provided for strapping either a positive or a negative bias voltage to the non-inverting input of the operational amplifier 300. An output signal of the amplifier 300 is coupled through a buffer amplifier stage 304 to analog switches 312, 314, and through the buffer amplifier 304 and an inverting amplifier 308 to analog switches 318, 320. A thermistor 326 provides a changing bias voltage to the amplifier 304 in response to changes in ambient temperature in the equipment enclosure. The analog switches 312, 314, 318, 320 control regeneration of selected segments of the information-bearing sinusoidal signal in accordance with a predetermined pattern chosen to maximize gain of the fundamental component of the carrier signal and minimize gain of harmonic components of the signal.

Referring momentarily to FIG. 8, there is shown at FIG. 8a a sinusoidal signal corresponding with the signal input to the analog switches 312, 314, 318, 320 which is of the form:

$$v_1(t) = A(t) \sin \omega t + B(t) \cos \omega t + noise \qquad (18)$$

The desired signals A(t) and B(t) modulating the carrier signal are precision ±DC signals having a bandwidth which is small compared with the bandwidth of the carrier frequency $\omega$. The signal contains noise from DC to frequencies much higher than $\omega$; the noise voltage can be 40 dB or more greater than the signal voltage. FIGS. 8b and 8c illustrate the output signals generated by a conventional full-wave demodulator using switching elements, for example, analog switches conducting for 180° of the input waveform. When the FIGS. 8b and 8c waveforms are low-pass filtered, analysis of the resulting DC signals shows that if the conduction periods of the switching elements are sufficiently accurate and are $\pi$ radians of the carrier frequency, cross-coupling approaches zero, DC bias in the input signal is rejected and does not appear at the output as a DC term, all even harmonics of the carrier frequency are rejected, non-harmonic AC input voltages do not generate DC voltages in the output signals, and all odd harmonics of the carrier that may be present in the input signal cause DC bias terms in the output signals. Thus, tne primary weakness of a full-wave demodulator is its susceptibility to odd harmonics.

FIGS. 8d and 8e illustrate output waveforms (prior to low-pass filtering) achieved by changing the conductive periods of demodulator switching elements to $2\pi/3$ radians of the carrier frequency. The third harmonic of the fundamental carrier frequency of the input signal and odd multiples of the third harmonic are thereby rejected. The only remaining harmonics susceptible to regeneration are the fifth, seventh, eleventh, thirteenth, etc. Mathematical analysis shows that with respect to the fundamental term, the fifth harmonic gain is 1/5; the seventh, 1/7; the eleventh, 1/11; etc. Many applications require greater attenuation of these harmonics. Analog multipliers can be used for greater harmonic rejection by multiplying the input signal by a pure reference sine wave; however, in addition to being more expensive than the implementation of the presently-described embodiment of the invention, analog multipliers exhibit non-linearities in gain, drift in scale factor with temperature changes, and undesired bias output and bias drift.

A novel feature of the present invention is the use in a demodulator of a store having a predetermined pattern of data stored therein, in concert with precision digital clocking to control the conduction periods of the switching elements. This approach eliminates major sources of non-linear gain, scale factor drift, bias drift, and harmonic susceptibility of the demodulator. Referring to FIG. 7, the 640 kHz clock signal from the system clock signal generator (149, FIG. 4) is input on a lead 328 to a divide-by-three counter comprised of J-K bistables 330, 332. A 213.3 kHz clock signal output from the bistable 332 is coupled via a lead 334 to a clock input C of a 12-stage binary counter 335 comprised of counter modules 336, 338, 340. The Q4 output of the first counter module 336 is a timing signal having a frequency of 13.3 kHz; the QI output signal of the second counter module 338 is a timing signal having a frequency of 6.67 kHz; and the Q4 output of the third counter module 340 is a timing signal having a frequency of 52.08 Hz, the frequency of revolution of the sensor assembly. The counter 335 functions as an address generator; the Q1-Q4 outputs, respectively, of the second and third counter modules 338, 340 form an address signal $A0 \propto A7$ coupled to a fixed store or read-only-memory (ROM) 342 which in the presently-described embodiment is a commercially available $4 \times 256$ bit fixed store such as a model 5301 manufactured by Monolithic Memories, Inc. The fixed store 342 is comprised of 256 locations holding predetermined data items as listed in Table 1. Each of the data items is a 4-bit word corresponding with a different one of 256 segments of the sinusoidal signal input to the analog switches 312, 314, 318, 320. Each of the bits 01-04 of one of the data items in the fixed store 342 represents a control signal controlling, respectively, the four analog switches 312, 314, 318, 320. The 01-04 output signals of the store 342 are coupled via level converter and driver circuits 346 to control inputs, respectively, of the analog switches 312, 314, 318, 320; only one of the level converter and driver circuits 346 is shown in FIG. 7, for the 01 output signal of the store 342.

Referring now to FIG. 8 and Table 1 in conjunction with FIG. 7, the data patterns illustrated in FIG. $8f_1-f_4$ are a pictorial representation of the Table 1 data patterns generated, respectively, at outputs 01-04, the output data word of the store 342, when as the address signal A7-A0 is cycled from 0 to $255_{10}$. The patterns for each output 01-04 are identical, each pattern being symmetrical about its center. All of the bits in one bit position, ordered as a vertical column of bits from address 000 to address $225_{10}$ in Table 1, form a character string of control signals for controlling the operation of the analog switch which corresponds with the one bit position. A 1-bit in the output data word represents an enabling signal closing the analog switch corresponding with the digit position of the 1-bit during the time period (150 microseconds in the present embodiment) when the particular data item is addressed and read from the store 342; a 0-bit in the output data word represents an inhibiting signal which opens the analog switch corresponding with the digit position of the 0-bit during the time period when the data item is output from the store 342. The ON time of each analog switch is thus varied in an approximate sinusoidal fashion over the half cycle wherein conduction is allowed, as shown in FIG. $8f_1-f_4$ and Table 1.

TABLE 1

| ADDRESS A7-A0 | DATA 04-01 | ADDRESS A7-A0 | DATA 04-01 | ADDRESS A7-A0 | DATA 04-01 | ADDRESS A7-A0 | DATA 04-01 |
|---|---|---|---|---|---|---|---|
| 0 | 0001 | 128 | 0010 | 80 | 1000 | 208 | 0100 |
| 1 | 0001 | 129 | 0010 | 81 | 1000 | 209 | 0100 |
| 2 | 0001 | 130 | 0010 | 82 | 0010 | 210 | 0001 |
| 3 | 0001 | 131 | 0010 | 83 | 1000 | 211 | 0100 |
| 4 | 0001 | 132 | 0010 | 84 | 1010 | 212 | 0101 |
| 5 | 0010 | 133 | 0010 | 85 | 1000 | 213 | 0100 |
| 6 | 0001 | 134 | 0010 | 86 | 1010 | 214 | 0101 |
| 7 | 0001 | 135 | 0010 | 87 | 1010 | 215 | 0101 |
| 8 | 1001 | 136 | 0110 | 88 | 1000 | 216 | 0100 |
| 9 | 0001 | 137 | 0010 | 89 | 1010 | 217 | 0101 |
| 10 | 0001 | 138 | 0010 | 90 | 1000 | 218 | 0100 |
| 11 | 0001 | 139 | 0010 | 91 | 0010 | 219 | 0001 |
| 12 | 1001 | 140 | 0110 | 92 | 1010 | 220 | 0101 |
| 13 | 0001 | 141 | 0010 | 93 | 1000 | 221 | 0100 |
| 14 | 0001 | 142 | 0010 | 94 | 0010 | 222 | 0001 |
| 15 | 1001 | 143 | 0110 | 95 | 1010 | 223 | 0101 |
| 16 | 0001 | 144 | 0010 | 96 | 1010 | 224 | 0101 |
| 17 | 0001 | 145 | 0010 | 97 | 1000 | 225 | 0100 |
| 18 | 1000 | 146 | 0100 | 98 | 0010 | 226 | 0001 |
| 19 | 0001 | 147 | 0010 | 99 | 1010 | 227 | 0101 |
| 20 | 1001 | 148 | 0110 | 100 | 1000 | 228 | 0100 |
| 21 | 0001 | 149 | 0010 | 101 | 0010 | 229 | 0001 |
| 22 | 1001 | 150 | 0110 | 102 | 1010 | 230 | 0101 |
| 23 | 1001 | 151 | 0110 | 103 | 0010 | 231 | 0001 |
| 24 | 0001 | 152 | 0010 | 104 | 1010 | 232 | 0101 |
| 25 | 1001 | 153 | 0110 | 105 | 1010 | 233 | 0101 |
| 26 | 0001 | 154 | 0010 | 106 | 0010 | 234 | 0001 |
| 27 | 1000 | 155 | 0100 | 107 | 1010 | 235 | 0101 |
| 28 | 1001 | 156 | 0110 | 108 | 0010 | 236 | 0001 |
| 29 | 0001 | 157 | 0010 | 109 | 1000 | 236 | 0100 |
| 30 | 1000 | 158 | 0100 | 110 | 0010 | 238 | 0001 |
| 31 | 1001 | 159 | 0110 | 111 | 0010 | 239 | 0001 |
| 32 | 1001 | 160 | 0110 | 112 | 1010 | 240 | 0101 |
| 33 | 0001 | 161 | 0010 | 113 | 0010 | 241 | 0001 |
| 34 | 1000 | 162 | 0100 | 114 | 0010 | 242 | 0001 |
| 35 | 1001 | 163 | 0110 | 115 | 1010 | 243 | 0101 |
| 36 | 0001 | 164 | 0010 | 116 | 0010 | 244 | 0001 |
| 37 | 1000 | 165 | 0100 | 117 | 0010 | 245 | 0001 |
| 38 | 1001 | 166 | 0110 | 118 | 0010 | 246 | 0001 |
| 39 | 1000 | 167 | 0100 | 119 | 1010 | 247 | 0101 |
| 40 | 1001 | 168 | 0110 | 120 | 0010 | 248 | 0001 |
| 41 | 1001 | 169 | 0110 | 121 | 0010 | 249 | 0001 |
| 42 | 1000 | 170 | 0100 | 122 | 0010 | 250 | 0001 |
| 43 | 1001 | 171 | 0110 | 123 | 0010 | 251 | 0001 |
| 44 | 1000 | 172 | 0100 | 124 | 0010 | 252 | 0001 |
| 45 | 0001 | 173 | 0010 | 125 | 0010 | 253 | 0001 |
| 46 | 1000 | 174 | 0100 | 126 | 0010 | 254 | 0001 |
| 47 | 1000 | 175 | 0100 | 127 | 0010 | 255 | 0001 |
| 48 | 1001 | 176 | 0110 | | | | |
| 49 | 1000 | 177 | 0100 | | | | |
| 50 | 1000 | 178 | 0100 | | | | |
| 51 | 1001 | 179 | 0110 | | | | |
| 52 | 1000 | 180 | 0100 | | | | |
| 53 | 1000 | 181 | 0100 | | | | |
| 54 | 1000 | 182 | 0100 | | | | |
| 55 | 1001 | 183 | 0110 | | | | |
| 56 | 1000 | 184 | 0100 | | | | |
| 57 | 1000 | 185 | 0100 | | | | |
| 58 | 1000 | 186 | 0100 | | | | |
| 59 | 1000 | 187 | 0100 | | | | |
| 60 | 1000 | 188 | 0100 | | | | |
| 61 | 1000 | 189 | 0100 | | | | |
| 62 | 1000 | 190 | 0100 | | | | |
| 63 | 1000 | 191 | 0100 | | | | |
| 64 | 1000 | 192 | 0100 | | | | |
| 65 | 1000 | 193 | 0100 | | | | |
| 66 | 1000 | 194 | 0100 | | | | |
| 67 | 1000 | 195 | 0100 | | | | |
| 68 | 1000 | 196 | 0100 | | | | |
| 69 | 1000 | 197 | 0100 | | | | |
| 70 | 1000 | 198 | 0100 | | | | |
| 71 | 1000 | 199 | 0100 | | | | |
| 72 | 1010 | 200 | 0101 | | | | |
| 73 | 1000 | 201 | 0100 | | | | |
| 74 | 1000 | 202 | 0100 | | | | |
| 75 | 1000 | 203 | 0100 | | | | |
| 76 | 1010 | 204 | 0101 | | | | |
| 77 | 1000 | 205 | 0100 | | | | |
| 78 | 1000 | 206 | 0100 | | | | |
| 79 | 1010 | 207 | 0101 | | | | |

The analog switch 312 conducts as illustrated in FIG. 8$f_1$ during the first half cycle of the input signal, and the analog switch 314 conducts as illustrated in FIG. 8$f_2$ during the second half cycle of the input signal to regenerate selected segments of the signal A(t) carried by the in-phase component of the carrier signal input to the analog switches 312, 314. The identical pattern is repeated for the analog switches 318, 320 but delayed by $\pi/2$ radians of the input signal as shown in FIGS. 8$f_3$ and $f_4$ to regenerate selected segments of the signal B(t) carried by the quadrature component of the input carrier signal. The input quadrature amplitude modulated signal as represented by FIG. 8a is thus divided into 256 segments for both the in-phase and the quadrature component of the signal, selected segments of each signal being regenerated for the in-phase component at an output node 360 of the analog switches 312, 314, and for the quadrature component at an output node 362 of the analog switches 318, 320.

The back-to-back diodes (1N4454) connected between the input terminals of the switches 312, 314, 316, 318 and ground conduct non-selected segments of the input signal to ground, when the switches are open.

The configuration of the pattern of regenerated signal portions stored in the store 342 and the number of segments in each pattern are variables which can be easily optimized for a particular application. Any candidate pattern can be analyzed by conventional mathematical techniques to determine the relative gain at each harmonic of the carrier frequency. The general objective in selecting a pattern is to optimize the gain of the fundamental component and minimize the gain of the harmonic components. The weighting for each harmonic may be tailored for each application; for example, if the input signal is filtered by a low-pass filter, third harmonic attenuation may be optimized at the expense of seventh, etc. The pattern shown in Table 1, based on a static store with 256 addresses, representing 256 signal segments or intervals, and four outputs, could be implemented with a smaller store augmented with additional logic circuits to replicate the pattern in proper polarity and phase relationship by techniques well known to digital circuit designers.

Table 2 below shows calculated harmonic gains for the patterns illustrated in FIGS. $8f_1$–$f_4$ and shown in detail in Table 1, and for the pattern illustrated in FIGS. 8d–e. The value listed for the fundamental frequencies is a ratio of the observed DC output voltages to the peak sine wave input at the carrier frequency. The listed harmonic gains are with respect to the corresponding fundamental frequency.

TABLE 2

| Frequency | FIG. 8f and TABLE 1 Pattern | FIG. 8d–e Pattern |
| --- | --- | --- |
| Fundamental | .508 | .55 |
| 3rd Harmonic | −65 dB | −∞ dB |
| 5th Harmonic | −40 dB | −14 dB |
| 7th Harmonic | −37 dB | −17 dB |
| 9th Harmonic | −38 dB | −19 dB |

The actual harmonic gains realized will be affected by the non-ideal response of the analog switches and amplifiers used in the demodulator. The degree of degradation is lower for low carrier frequencies and for high quality switches. The orthogonality of the demodulator is realized by the inherent precision of the store and the clock signal.

The in-phase component of the regenerated signal segments output at the node 360 of analog switches 312, 314 is coupled through a low-pass filter circuit 364 and the buffer amplifier 186 to an X axis rate output terminal for coupling to an external user device such as an aircraft attitude and heading reference system. The low-pass filter circuit 364 is provided with bias voltage selection terminals K, L, M for selecting either negative or positive bias voltage at the non-inverting input of the circuit. The regenerated quadrature component signal at the node 362 output of analog switches 318, 320 is coupled via a low-pass filter circuit 366 and the buffer amplifier 187 to a Y axis rate output terminal for coupling to the external user device.

Figure 7B:
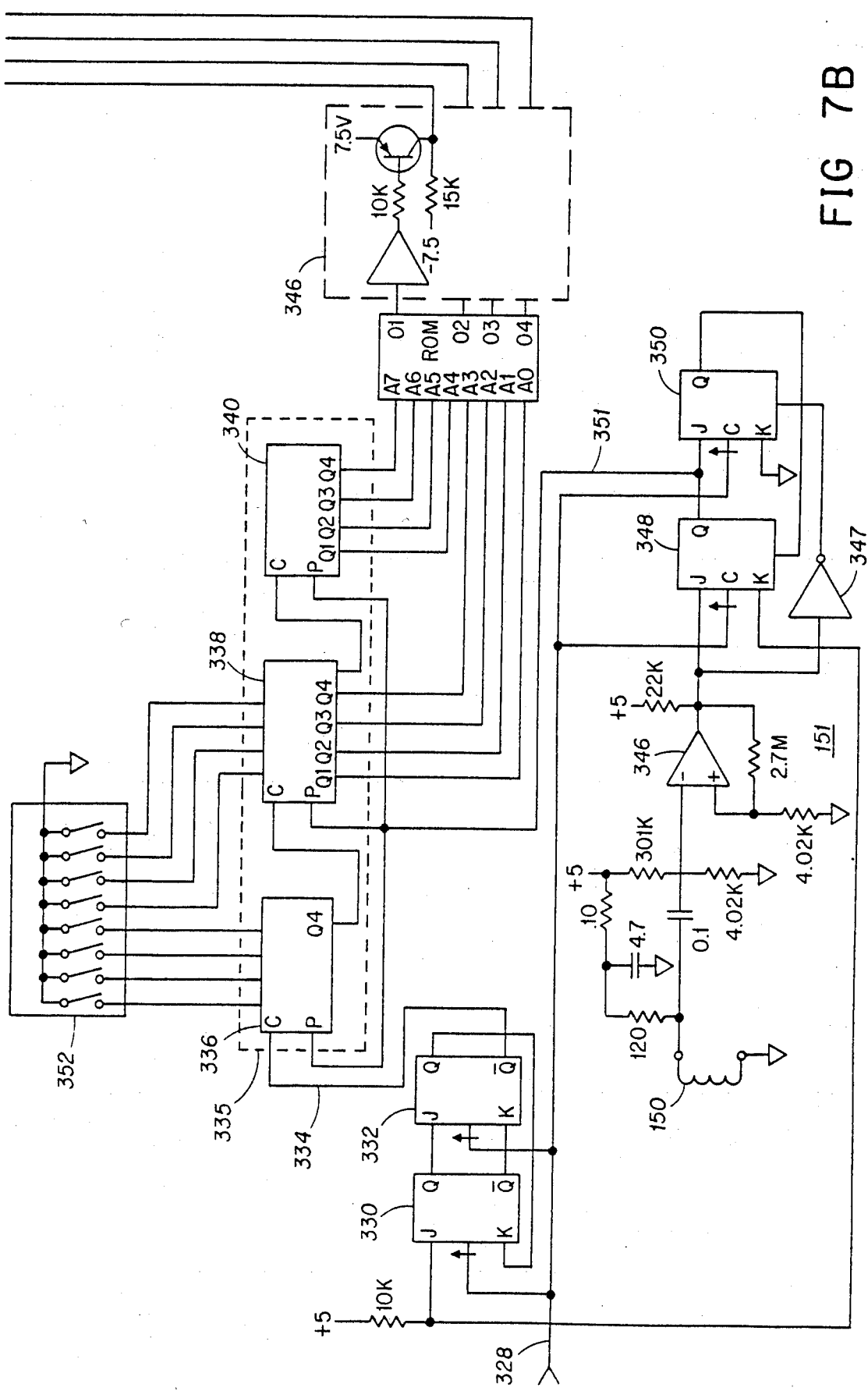

Referring to FIG. 7B, a synchronization pulse generator comprising a transducer 150 (described previously with reference to FIG. 4), an amplifer circuit 346, an inverter circuit 347 and two bistables 348, 350, provides a means for adjusting the phase of the sampling pattern to com-pensate for phase shifts in the system components, a synchronizing signal representative of the position of the rotating assembly (141, FIG. 4) with respect to the fixed elements of the sensor assembly is coupled from the transducer 150 through the amplifier 346 to the J input of bistable 348 and to the inverter circuit 347. The bistable 348 regenerates the synchronizing pulse at the Q output thereof on a lead 351 coupled to the preset input P of the counter modules 336, 338, 340. The bistable 348 aligns the regenerated synchronizing pulse with the 640 kHz timing signal input on the lead 328. The inverter circuit 347 and the bistable 350 form a latch holding the bistable 348 disabled subsequent to the regeneration of one synchronizing pulse. The counter 336, 338, 340 is responsive to the regenerated synchronizing pulse on the lead 351 to preset the count stored therein to a predetermined number in accordance with signals output from a multiposition switch 352 coupled to the counter modules 336, 338; the Q4–Q1 output signals of the counter module 340 representing the high order address bits A7–A4 of the fixed memory 342 are preset to zero upon occurrence of the synchronizing pulse on the lead 351. Thus, the sampling vector of the demodulator is aligned with respect to the synchronizing pulse derived from the rotating mechanism, precluding the need for precision mechanical adjustments of the synchronization detector with respect to the rotating sensors. The address counters 336, 338, 340 cycle repetitively through the 256 addresses, and when a synchronizing pulse occurs, the counters are reset to the preset address. The preset address may be changed by means of the switch 352 to shift the occurrence of the zero address in time with respect to the synchronizing pulse, thereby shifting the entire sampling pattern in time with respect to the synchronizing pulse or reference time. The preset address may be stored as shown in the switch module 352, or in a system register or store location with the preset address being transferred to the counter under control, for example, of a system data processor responsive to the occurrence of the synchronizing signal. As implemented in FIG. 7B, the most significant bit of the switch 352, (corresponding with output Q4 of counter module 338 and address bit A3) moves the synchronization pattern approximately 11°; the least significant bit, by 0.09°, thereby providing accuracy to within ±0.05 percent of a desired setting.

The circuits utilized to implement the embodiment of the present invention described with reference to FIGS. 7 and 4 are commercially available components. The frequency-to-voltage converters 176, 177 are LM131A integrated circuits manufactured by National Semiconductor Corporation; the bias circuit 300 utilized a type 148 operational amplifier; the various filter, buffer amplifier and inverter circuits 186, 187, 304, 308, 364, 366 all utilized type 108 operational amplifiers; the inverter 347 is a component of a type 4049 integrated circuit; the amplifier circuit 346 is a type 139 operational amplifier; the analog switches 312, 314, 318, 320 are type 4066 integrated circuit modules; the bistables 330, 332, 348, 350 are type 4027 integrated circuit modules; the level converter and driver circuits 346 are comprised of, respectively, type 40109 signal-level translation integrated circuits and 2N3251A transistors; and the counter modules 336, 338, 340 are type 4029 integrated circuit modules.

Terms relating to digital signal operations utilized herein to describe the instant invention are defined in *IFIP-ICC Vocabulary of Information Processing* compiled by the Joint Technical Committee on Terminology of the International Federation for Information Processing and the International Computation Centre, First English language edition, 1966, North-Holland Publishing Company, Amsterdam.

I have described herein a low-cost, two-axis rate and acceleration sensor utilizing piezoelectric generator elements affixed to a rotating structure for generating a periodic signal having a period related to the speed of rotation of the rotating structure and having an amplitude representing the rates and accelerations. A demodulator for regenerating the rate and acceleration analog voltages incorporates an alignment and sampling controller utilizing a fixed store and precision digital clocking to control the conduction periods of analog switches which regenerate selected segments of the input periodic signal in accordance with a predetermined pattern stored in the fixed store. This approach eliminates major sources of non-linear gain, scale factor drift, bias drift, and harmonic susceptibility.

While the principles of the invention have now been made clear in an illustrative embodiment, there will be immediately obvious to those skilled in the art many modifications of structure, arrangment, proportions, the elements, materials and components, used in the practice of the invention and otherwise, which are particularly adapted for specific environments and operating requirements without departing from those principles. The appended claims are therefore intended to cover and embrace any such modifications, within the limits only of the true spirit and scope of the invention.

What is claimed is:

1. In apparatus of the type generating a periodic signal having a peak amplitude representing a physical quantity measured by said apparatus, said periodic signal including a fundamental component and a plurality of harmonic components, a demodulator, comprising:
   means for dividing a period of said periodic signal into a plurality of segments;
   means for regenerating selected ones of said plurality of segments of said periodic signal in accordance with a predetermined pattern; and
   means receiving said ones of said plurality of selected segments of said periodic signal for generating a voltage related to said measured physical quantity, wherein said predetermined pattern selects segments of said periodic signal which maximize gain of said fundamental component and minimize gain of said plurality of harmonic components of said periodic signal.

2. Apparatus as claimed in claim 1 further including means for synchronizing said dividing means with said periodic signal generating means.

3. In a rotating apparatus of the type measuring a physical quantity acting on said apparatus wherein said apparatus generates a periodic signal having a frequency related to the frequency of rotation of said rotating apparatus and an amplitude representing the physical quantity being measured, a signal demodulator, comprising:
   a synchronization detector coupled to said rotating apparatus, said synchronization detector generating a synchronizing signal representing a transition from one period to a next subsequent period of said periodic signal;
   a source of timing signals;
   an address generator responsive to said timing signals to generate a sequence of addresses, said synchronizing signal being coupled to said address generator and said address generator responsive thereto to reset to an initial address of said sequence of addresses;
   a store having a plurality of data items stored in a corresponding plurality of locations, said plurality of data items having a predetermined pattern, each of said data items corresponding in time with a different segment of one period of said periodic signal, each of said data items comprising at least one bit representing either an enabling or a disabling control signal, said store having an address input coupled to said address generator;
   a switching element having an input terminal receiving said periodic signal, an output terminal, and a control terminal coupled to said store, said control terminal receiving said control signals, said control signals serving to enable or disable said switching element to regenerate segments of said periodic signal on said output terminal in accordance with said predetermined pattern as said plurality of data items are output from said store in response to said sequence of addresses, the pattern of regenerated segments being predetermined to optimize gain of the fundamental component of said periodic signal and minimize gain of harmonic components of said periodic signal.

4. A process for demodulating a sinusoidal carrier, amplitude modulated signal, comprising:
   dividing a cycle of said signal into a plurality of segments;
   preselecting segments of said signal for regeneration, which preselected segments maximize gain of the modulating signal carried by the fundamental component of the carrier signal and minimize gain of the modulating signal carried by harmonic components of the carrier signal;
   regenerating said preselected signal segments; and
   filtering said regenerated signal segments to produce a DC output related to the modulating signal.

5. In an apparatus of the type generating a periodic signal having a peak amplitude representing a physical quantity measured by said apparatus, said periodic signal including a fundamental component and a plurality of harmonic components, a demodulator comprising:
   means for dividing a period of said periodic signal into a plurality of segments wherein said dividing means includes a source of timing signals having a repetition rate substantially greater than the period of said periodic signals;
   means responsive to said timing signals for successively generating a plurality of addresses in succession, each of said addresses having a duration equal to one of said plurality of segments of said periodic signal;
   means for regenerating selected ones of said plurality of segments of said periodic signal in accordance with a predetermined pattern wherein said regenerating means including means receiving said addresses for storing a plurality of data items in a corresponding plurality of locations, said plurality of data items corresponding with said predetermined pattern, and said storing means being responsive to said plurality of addresses to output said plurality of data items in succession;
   means receiving ones of said plurality of said selected segments of said periodic signal for generating a voltage related to said measured physical quantity, wherein said predetermined pattern selects segments of said periodic signal which maximize gain of said fundamental component and minimize gain of said plurality of harmonic components of said periodic signal; and means for receiving said periodic signal for successively switching said selected segments of said periodic signal to said voltage generating means in response to said plurality of data items successively received from said storing means.

6. Apparatus as claimed in claim 5, further including means for synchronizing said dividing means with said periodic signal generating means.

7. Apparatus as claimed in claim 6 wherein said synchronizing means includes means for detecting a synchronizing signal representing a transition from one period of said periodic signal to the next subsequent period of said periodic signal; and means coupled to said address generating means for storing a predetermined starting address, said address generating means including means responsive to said synchronizing signal to set said address generating means to said predetermined starting address, thereby synchronizing said predetermined pattern with said periodic signal.

8. Apparatus for detecting first and second functions modulating, respectively, an in-phase component and a quadrature component of a periodic signal, said apparatus comprising:

a source generating the periodic signal;

first and second switching elements each receiving the periodic signal;

a store coupled to said first and second switching elements, said store having a plurality of data items stored in a corresponding plurality of locations of said store;

a source of timing signals having a frequency substantially greater than the frequency of the periodic signal;

an address generator receiving the timing signals, said address generator being responsive to the timing signals to generate a cyclic address, the cyclic address being coupled to said store, said store being responsive to the cyclic address to output the plurality of data items successively to said first and second switching elements, each of the plurality of the data items having a first character and a second character, each of the characters of the plurality of data items representing an enabling signal or a disabling signal, the first characters of the plurality of data items forming a first character string having a predetermined pattern with a duration of one period of the periodic signal, the predetermined pattern of the first character string being in phase with the in-phase component of the periodic signal, the first character serving to enable or disable said first switching element with each successive output of one of the data items from said store, the second character of the plurality of data items forming a second character string having the predetermined pattern in-phase with the quadrature component of the periodic signal, the second character serving to enable or disable said second switching element with each successive output of one of the data items from said store, the predetermined pattern of first and second characters controlling the corresponding one of said first and second switching elements, when enabled, to regenerate segments of the periodic signal which maximize gain of the fundamental component of the periodic signal and minimize gain of harmonic components of the periodic signal;

a synchronizing signal generator coupled to said periodic signal source, said synchronizing signal generator generating a signal representing a transition of the periodic signal from one period to a next subsequent period thereof, said address generator being responsive to the synchronizing signal to preset the cyclic address to an initial address; and first and second filters coupled respectively to said first and second switching elements, said first filter receiving the signal segments regenerated by said first switching element and having an output representing the first modulating function, said second filter receiving the signal segments regenerated by said second switching element and having an output representing the second modulating function.

9. A process for demodulating a sinusoidal carrier, amplitude modulated signal wherein the sinusoidal carrier signal includes an in-phase component and a quadrature component, each modulated with a separate modulating function, comprising:

dividing a cycle of said signal into a plurality of segments;

preselecting segments of said signal for regeneration, which preselected segments maximize gain of the modulating signal carried by the fundamental component of the carrier signal and minimize gain of the modulated signal carried by harmonic components of the carrier signal, wherein segments of both the in-phase component and the quadrature component of the sinusoidal carrier signal are separately preselected;

regenerating said preselected signal segments; and filtering said regenerated signal segments to produce a DC output related to said separate modulating functions.

* * * * *